(12) United States Patent  (10) Patent No.: US 12,339,125 B2
Holzknecht et al.  (45) Date of Patent: Jun. 24, 2025

(54) METHOD FOR PROCESSING MEASUREMENT DATA FROM AN ENVIRONMENT SENSOR OF A VEHICLE WITH COMPENSATION OF LATENT VEHICLE DATA, COMPUTING DEVICE, AND COMPUTER PROGRAM

(71) Applicant: Bayerische Motoren Werke Aktiengesellschaft, Munich (DE)

(72) Inventors: Stefan Holzknecht, Feldkirchen (DE); Marcel Welpot, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 77 days.

(21) Appl. No.: 18/261,660

(22) PCT Filed: Jan. 11, 2022

(86) PCT No.: PCT/EP2022/050438
§ 371 (c)(1),
(2) Date: Jul. 14, 2023

(87) PCT Pub. No.: WO2022/152694
PCT Pub. Date: Jul. 21, 2022

(65) Prior Publication Data
US 2024/0068819 A1   Feb. 29, 2024

(30) Foreign Application Priority Data
Jan. 15, 2021   (DE) ..................... 10 2021 100 794.1

(51) Int. Cl.
*G01C 21/00* (2006.01)
*B60W 50/06* (2006.01)
(Continued)

(52) U.S. Cl.
CPC ............. *G01C 21/28* (2013.01); *B60W 50/06* (2013.01); *B60W 60/001* (2020.02);
(Continued)

(58) Field of Classification Search
CPC ....... G01C 21/28; G01C 25/00; B60W 50/06; B60W 60/001; B60W 2420/403;
(Continued)

(56) References Cited

U.S. PATENT DOCUMENTS 11,594,037 B1* 2/2023 Grossman ............... G06V 20/56
2010/0198442 A1* 8/2010 Appelman ............... G05D 1/02
701/25
(Continued)

FOREIGN PATENT DOCUMENTS

DE 10 2016 212 326 A1 1/2018
DE 10 2017 217 443 A1 4/2019

OTHER PUBLICATIONS

J.-M. Georg, J. Feiler, S. Hoffmann and F. Diermeyer, "Sensor and Actuator Latency during Teleoperation of Automated Vehicles," 2020 IEEE Intelligent Vehicles Symposium (IV), Las Vegas, NV, USA, 2020, pp. 760-766, doi: 10.1109/IV47402.2020.9304802. (Year: 2020).*

(Continued)

*Primary Examiner* — Russell Frejd
*Assistant Examiner* — Brittany Renee Peko
(74) *Attorney, Agent, or Firm* — Crowell & Moring LLP

(57) ABSTRACT

A method for processing measurement data from an environment sensor of a vehicle. Measurement data that describes an environment of the vehicle is received from the environment sensor, and driving planning data that describes a future movement of the vehicle during semiautomated operation is also received. Vehicle data describing a position and/or movement of the vehicle is determined, and the
(Continued)

measurement data is processed based on the vehicle data. Vehicle data is also predicted for at least one point in time during the future movement of the vehicle based on the vehicle planning data, and the measurement data for the at least one point in time is processed based on the predicted vehicle data.

7 Claims, 2 Drawing Sheets

(51) Int. Cl.
*B60W 60/00* (2020.01)
*G01C 21/28* (2006.01)
*G01C 25/00* (2006.01)

(52) U.S. Cl.
CPC ....... *G01C 25/00* (2013.01); *B60W 2420/403* (2013.01); *B60W 2420/408* (2024.01); *B60W 2420/54* (2013.01); *B60W 2556/50* (2020.02); *B60W 2756/10* (2020.02)

(58) Field of Classification Search
CPC ....... B60W 2420/408; B60W 2420/54; B60W 2556/50; B60W 2756/10; G01S 7/40; G01S 7/497; G01S 7/52004; G01S 13/86; G01S 15/86; G01S 15/931; G01S 17/86; G01S 2013/9316; G01S 2013/9318; G01S 17/931

See application file for complete search history.

(56) References Cited

U.S. PATENT DOCUMENTS

| | | |
|---|---|---|
| 2017/0124781 A1 | 5/2017 | Douillard et al. |
| 2018/0261095 A1 | 9/2018 | Qiu et al. |
| 2019/0107399 A1* | 4/2019 | Kawauchi ............. G01C 21/28 |
| 2019/0193730 A1* | 6/2019 | Voorheis ............... B60W 30/12 |
| 2020/0124447 A1* | 4/2020 | Schwindt ............. G01D 18/006 |
| 2021/0157325 A1* | 5/2021 | Beller .................. G05D 1/0214 |

OTHER PUBLICATIONS

PCT/EP2022/050438, International Search Report dated May 9, 2022 (Two (2) pages).

German Search Report issued in German application No. 10 2021 100 794.1 dated Sep. 15, 2021, with Statement of Relevancy (Eight (8) pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

\* cited by examiner

METHOD FOR PROCESSING MEASUREMENT DATA FROM AN ENVIRONMENT SENSOR OF A VEHICLE WITH COMPENSATION OF LATENT VEHICLE DATA, COMPUTING DEVICE, AND COMPUTER PROGRAM

This application is a 371 of International Application No. PCT/EP2022/050438, filed Jan. 11, 2022 which claims priority under 35 U.S.C. § 119 from German Patent Application No. 10 2021 100 794.1, filed Jan. 15, 2021, the entire disclosure of which is herein expressly incorporated by reference.

BACKGROUND AND SUMMARY OF THE INVENTION

The present invention relates to a method for processing measurement data from an environment sensor of a vehicle. Furthermore, the present invention relates to a computing device for a vehicle. In addition, the present invention relates to a computer program and a non-transitory computer-readable (memory) medium.

Modern vehicles comprise different driver assistance systems, which assist a driver or user in controlling the vehicle. A plurality of environment sensors is assigned to these driver assistance systems, using which the environment of the vehicle can be detected. Measurement data are typically provided by these environment sensors, which describe the environment or objects in the environment. Moreover, vehicle data which describe the position and/or the movement of the vehicle are used by the driver assistance systems. These vehicle data can describe, for example, a velocity, a yaw rate, or the like. The environment sensors and the sensors using which the vehicle data are provided can be assigned to different control units in the vehicle.

Delays can occur within the vehicle due to more and more complex wiring system architectures, which prevent the timely provision of sensor signals. Furthermore, additional delays within the control units can increase the time delay. A further influence is the use of time filtered signals. This can have the result that presently or currently detected measurement data of the environment sensor no longer correlate with the vehicle data or wiring system data when these vehicle data arrive with a delay and/or are based on time filtered data. In this case, only those vehicle data can be used which include only very minor changes over a sufficiently long time. The detection of the environment can thus be delayed or not carried out precisely.

The vehicle data are also required for calibration processes in which the environment sensors are calibrated during the journey of the vehicle. To enable precise calibration of the environment sensors, the vehicle data cannot be received with a delay or at least can only have very minor changes for a sufficiently long time. The calibration process can slow in the event of a delay of the vehicle data, since the requirements for a minor change of the data are often not provided. If non-static, thus dynamic and delayed vehicle data are used, the quality of the calibration of the environment sensors suffers and sometimes it cannot be completed.

It is the object of the present invention to disclose a solution for how the processing of measurement data from an environment sensor of a vehicle of the type mentioned at the outset can be carried out more reliably.

This object is achieved according to the invention by a method, by a computing device, by a computer program, and by a non-transitory computer-readable (memory) medium having the features according to the independent claims. Advantageous refinements of the invention are specified in the dependent claims.

A method according to the invention is used to process measurement data from an environment sensor of a vehicle. The method comprises receiving measurement data from the environment sensor, wherein the measurement data describe an environment of the vehicle. Furthermore, the method comprises determining vehicle data which describe a position and/or a movement of the vehicle. In addition, the method comprises processing the measurement data in consideration of the vehicle data. Furthermore, the method comprises receiving driving planning data, which describe a future movement of the vehicle during at least semiautomated operation of the vehicle. In addition, the method comprises predicting the vehicle data for at least one point in time during the future movement of the vehicle on the basis of the driving planning data. Moreover, the method comprises processing the measurement data received for this at least one point in time in consideration of the predicted vehicle data.

The measurement data and/or sensor data from the environment sensor are to be further processed with the aid of the method. The term processing is to be understood in the present case in particular to mean that the measurement data are evaluated and/or adapted in consideration of the vehicle data. The term processing is also to be understood to mean that further calculations are performed and/or models are determined on the basis of the measurement data and the vehicle data. The method can be carried out using a computing device of the vehicle. The computing device can be, for example, a control unit, which is assigned to the environment sensor. The environment sensor can be a radar sensor, a lidar sensor, a camera, an ultrasonic sensor, or the like. The measurement data can describe, for example, a sensor signal emitted by the environment sensor and reflected in the environment. The measurement data can also be image data which describe the environment. These measurement data can be transmitted from the environment sensor to the computing device. In principle, it can also be provided that the computing device receives measurement data from multiple environment sensors. In particular objects and/or other road users in the surroundings of the vehicle can be recognized on the basis of the measurement data. The term environment is to be understood in the present case as the area outside the vehicle which can be detected using the environment sensor.

Furthermore, the vehicle data, which describe the current position and/or the movement of the vehicle, are received from the computing device. The vehicle data can describe the ego movement of the vehicle. The movement of the vehicle can describe both a velocity of the vehicle and a yaw rate here. Furthermore, the movement of the vehicle can also describe a pitch and/or a roll of the vehicle. Furthermore, the installation position of the environment sensor on or in the vehicle is known. The environment can then be detected on the basis of the known installation position of the environment sensor, the measurement data, and the vehicle data. This means in particular that distances between the vehicle and objects in the environment are determined. Moreover, relative velocities and/or angles between the vehicle and the objects can be determined. Furthermore, an environment model for the environment of the vehicle can be ascertained on the basis of the measurement data and the vehicle data.

Furthermore, the driving planning data can be received by means of the computing device. These driving planning data can be determined by means of a driving planning device.

This driving planning device can plan or specify the future movement of the vehicle. For example, future driving maneuvers or a future driving strategy for at least semiautomated driving operation of the vehicle can be planned by means of the driving planning device. This driving planning device can specify or control the longitudinal guidance and/or lateral guidance of the vehicle. On the basis of the driving planning data, the movement data can be predicted for at least one point in time for the future at least semiautomated driving of the vehicle. During the at least semiautomated driving, driver assistance systems or the driving planning device can take over the longitudinal guidance and the lateral guidance of the vehicle. During the future drive, the vehicle is thus to be operated at least according to level 2 of the norm SAE J3016. Thus, for example, the velocity and the yaw rate can be estimated for the at least one point in time. The vehicle data can preferably also be estimated for multiple points in time on the basis of the driving planning data.

The present invention is based on the finding that current vehicles are not exclusively maneuvered by a driver, but rather have the option of being controlled by a technical system or a driving planning device. The vehicle data can be predicted with high confidence on the basis of the driving planning data. The measurement data, which describe the environment at the at least one point in time for which the vehicle data are also predicted, can now be processed on the basis of the predicted vehicle data. Using these predicted vehicle data, for example, the environment of the vehicle can be detected more reliably than on the basis of known latency-afflicted and/or time-filtered wiring system signals alone. Overall, the processing of the measurement data can take place more reliably.

Moreover, wiring system data are preferably received from at least one movement sensor of the vehicle, wherein the wiring system data also describe the position and/or the movement of the vehicle. Furthermore, the measurement data are moreover preferably processed on the basis of the wiring system data. The wiring system data also describe, like the vehicle data, which are predicted on the basis of the driving planning data, the position and/or the movement of the vehicle. As described at the outset, these wiring system data can be transmitted, due to the wiring system architecture and/or a filtering, with a time delay to the environment sensor or a control unit of the environment sensor. The wiring system data can be used here to check the plausibility of the predicted vehicle data. The wiring system data and/or the predicted vehicle data can be weighted. Moreover, the time delay or the latency of the wiring system data can be determined and possibly taken into consideration in the future on the basis of the predicted vehicle data and the wiring system data.

In a further embodiment, the driving planning data are received from a driving planning device of the vehicle. In other words, the driving planning data can be determined by the vehicle-internal driving planning device and transmitted to the computing device. The driving planning device can be part of a driver assistance system of the vehicle or of driver assistance systems of the vehicle. The driving planning device can be used, for example, for adaptive cruise control with lateral guidance or for remote control of the vehicle. The driving planning device can also be part of a freeway pilot, a parking maneuver assistant, or the like. The driving planning data of the vehicle-internal driving planning device can thus be used to predict the vehicle data.

According to an alternative embodiment, the driving planning data are received from a vehicle-external driving planning device. Such a vehicle-external driving planning device can exchange data wirelessly with the vehicle. The measurement data which describe the environment can be transmitted from the vehicle to the vehicle-external driving planning device here. The driving planning data can then be determined by means of the external driving planning device on the basis of the measurement data and transmitted to the vehicle.

In a further embodiment, detection data are received from an external detection device, wherein the detection data describe the position and/or movement of the vehicle and the detection data are compared to the predicted vehicle data. The position, the velocity, and/or rotational movements of the vehicle around the vehicle axes can be determined, in particular progressively, by means of the external detection device. The external detection device can include at least one sensor device, by means of which the vehicle or an area of the outer envelope of the vehicle can be progressively detected. It can also be provided that a reference point of the vehicle is detected by means of the sensor device.

The sensor device of the external detection device can be in particular an optical sensor, for example a camera, a lidar sensor, or the like. The position of the sensor device can be known here. The data, which are provided by means of the sensor device and which describe the respective detected area of the outer envelope of the vehicle, can be further processed by means of the external detection device. In particular, the detection data which describe the movement of the vehicle for the at least one point in time can be determined by means of the external detection device or a computer of the external detection device. These detection data can then be transmitted from the external detection device to the vehicle or the computing device of the vehicle. The data can then be compared to the predicted vehicle data and thus checked by means of the computing device of the vehicle.

In this case, it is provided in particular that control signals for controlling and/or regulating the movement of the vehicle are output in dependence on the comparison. The position and/or movement of the vehicle can be determined with high precision on the basis of the detection data of the external detection device. If the comparison of the predicted vehicle data and the detection data has the result that the predicted vehicle data deviate from the detection data, control signals can be output to control the vehicle movement. It can also be provided that the control signals are adapted in dependence on a deviation of the predicted vehicle data from the detection data. These control signals are used in particular to control the vehicle during the at least semiautomated operation. A control or regulation of the movement of the vehicle during the at least semiautomated operation can be enabled by the consideration of the detection data. Therefore, for example, influences of the tires, the roadway, and/or environmental influences can be compensated for.

To improve the prediction of the vehicle data, further data can be used. For example, onboard sensor data and/or offboard sensor data from movement sensors, an inertial sensor system, odometry data, data of a satellite-based position determination system, and/or data from further environment sensors can be used. The prediction can take place intrinsically or extrinsically depending on the system. In addition, the prediction can also use recursive loops as input variables in addition to internal and external sensor systems.

The measurement data are preferably processed to calibrate the environment sensor. The measurement data can be processed or corrected in this case in consideration of the vehicle data for the calibration. In particular, the method can be used when the vehicle is maneuvering on a calibration route. The vehicle can be maneuvered in an at least semi-automated manner on the calibration route in this case. The movement of the vehicle on the calibration route can be planned by the driving planning device. The driving planning data thus describe the movement of the vehicle along the calibration route. At least one reference object can be detected in this case using the environment sensor. The measurement data then describe the reference object. In this case, these measurement data are uncalibrated or originate from the uncalibrated environment sensor.

Moreover, the position of the reference object can be known. Furthermore, the installation position of the environment sensor on or in the vehicle can be known. For the calibration of the environment sensor, it is important that the vehicle data are precisely known. These vehicle data can be predicted on the basis of the driving planning data. Measurement variables, such as the distance to the reference object, the relative velocity between the vehicle and the reference object, and/or the angle between the vehicle and the reference object can be determined on the basis of the measurement data. These measurement variables can be compared to the variables which are ascertained on the basis of the vehicle data and the known position of the reference object. Correction data, which are used to calibrate the environment sensor, can then be determined on the basis of the comparison. In the processing of the measurement data, in this case the measurement data are corrected or adapted using the correction data.

To increase the confidence in the prediction of the vehicle data during the calibration, the above-described external detection device can be used and a comparison of the predicted vehicle data to the detection data of the external detection device can be carried out. Reference object data, which describe the position of the at least one reference object, and/or route data, which describe the calibration route, can also be transmitted to the vehicle from the external detection device.

A computing device according to the invention for a vehicle is configured to carry out a method according to the invention and the advantageous refinements thereof. The computing device can be formed by at least one control unit of the vehicle, which is in particular assigned to the environment sensor.

A sensor system according to the invention for a vehicle comprises a computing device according to the invention. Moreover, the sensor system comprises the environment sensor. In addition, the sensor system can comprise a driving planning device, by means of which the driving planning data can be provided. It can also be provided that the sensor system receives the driving planning data from a vehicle-external driving planning device. The computing device of the sensor system is configured to predict the vehicle data on the basis of the driving planning data for the at least one point in time. In addition, the sensor system can comprise vehicle-internal movement sensors, using which the wiring system data can be provided.

A vehicle according to the invention comprises a computing device according to the invention and/or a sensor system according to the invention. The vehicle is designed in particular as a passenger vehicle. The vehicle can also be designed as a utility vehicle.

A further aspect of the invention relates to a computer program, comprising commands which, upon the execution of the program by a computing device, cause it to carry out a method according to the invention and the advantageous embodiments thereof. Furthermore, the invention relates to a computer-readable (memory) medium comprising commands which, upon the execution by a computing device, cause it to carry out a method according to the invention and the advantageous embodiments thereof.

A further aspect of the invention relates to an external detection device for detecting a vehicle. The detection device comprises an external sensor device for detecting the vehicle during maneuvering. Moreover, the detection device comprises a computer for determining detection data, which describe a position and/or a movement of the vehicle during the maneuvering of the vehicle, on the basis of data of the sensor device. In addition, the detection device comprises a transmitting device for transmitting the detection data. The external detection device can include multiple sensor devices which are arranged at known positions. One area of an outer envelope of the vehicle can be detected using each of the sensor devices. The computer can determine the vehicle data on the basis of the respectively detected areas of the outer envelope. For this purpose, the areas of the outer envelope can be compared to a three-dimensional model of the vehicle.

The preferred embodiments presented with reference to the method according to the invention and the advantages thereof apply accordingly to the computing device according to the invention, the sensor system according to the invention, the vehicle according to the invention, the computer program according to the invention, the computer-readable (memory) medium according to the invention, and the detection device according to the invention.

Further features of the invention result from the claims, the figures, and the description of the figures. The features and combinations of features mentioned above in the description and the features and combinations of features mentioned hereinafter in the description of the figures and/or solely shown in the figures are usable not only in the respective specified combination but also in other combinations or alone without departing from the scope of the invention.

The invention will now be explained in more detail on the basis of preferred exemplary embodiments and with reference to the appended drawings.

DETAILED DESCRIPTION OF THE DRAWINGS

In the figures, identical or functionally-identical elements are provided with identical reference signs.

Figure 1:
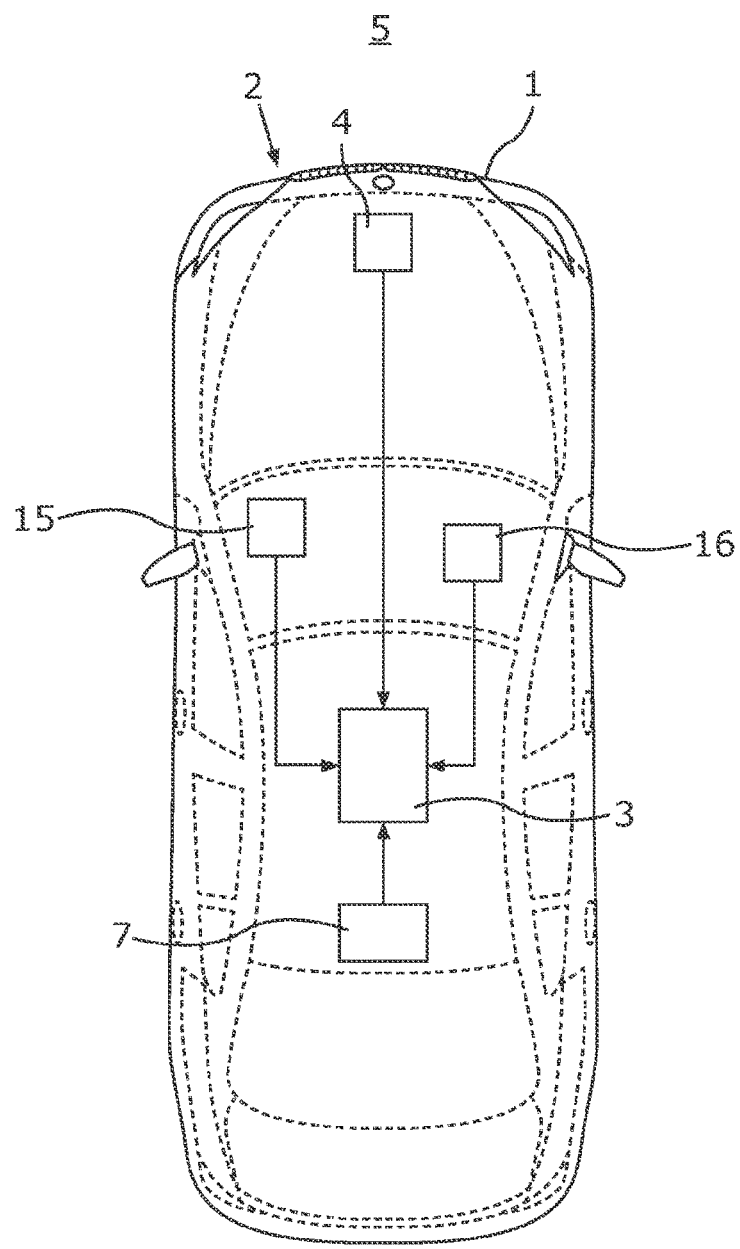
FIG. 1 shows a schematic illustration of a vehicle, which comprises a sensor system having an environment sensor.

FIG. 1 shows a vehicle 1, which is designed in the present case as a passenger vehicle, in a top view. The vehicle 1 comprises a sensor system 2, which in turn comprises an environment sensor 4. This environment sensor 4 can be designed, for example, as a lidar sensor, as a laser scanner, thus a radar sensor, as a camera, or as an ultrasonic sensor. In principle, the sensor system 2 can comprise multiple environment sensors 4.

In addition, the sensor system 2 comprises a computing device 3, which is connected to the environment sensor 4 for data transmission. The computing device 3 can be formed, for example, by a control unit. Measurement data, which describe objects or reference objects 6 in an environment 5 of the vehicle 1, can be provided using the environment sensor 4. These measurement data can be transmitted from the environment sensor 4 to the computing device 3 and further processed accordingly there. Furthermore, the sensor system 2 comprises a receiving device 7, by means of which data can be received wirelessly.

Furthermore, the sensor system 2 comprises a driving planning device 15, by means of which a future and at least semiautomated drive of the vehicle 1 can be planned. In particular, driving planning data can be determined by means of the driving planning device 15, which describe movement of the vehicle 1 during the future at least semiautomated drive. These driving planning data are transmitted from the driving planning device 15 to the computing device 3. On the basis of the driving planning data, the computing device 3 can then estimate or predict vehicle data for at least one point in time for the future at least semiautomated drive. The vehicle data describe a position of the vehicle 1, a velocity of the vehicle 1, and/or a rotation of the vehicle 1 around the vehicle vertical axis, the vehicle transverse axis, and/or the vehicle longitudinal axis. Moreover, control signals for controlling the vehicle 1 during the at least semiautomated drive can be output by means of the driving planning device 15. It can also be provided that the driving planning data are determined using a vehicle-external driving planning device and transmitted to the vehicle 1.

Moreover, the sensor system 2 comprises a movement sensor 16, by means of which wiring system data are provided. These wiring system data also describe the position and/or movement of the vehicle 1. However, these wiring system data can be transmitted with a delay or with a latency to the computing device 3 due to the wiring system architecture of the vehicle.

The measurement data of the environment sensor 4 can be processed on the basis of the predicted vehicle data. The processing of the measurement data can be carried out to detect the environment 5. The measurement data and the vehicle data can also be used to calibrate the environment sensor 4. This will be explained hereinafter on the basis of FIG. 2.

Figure 2:
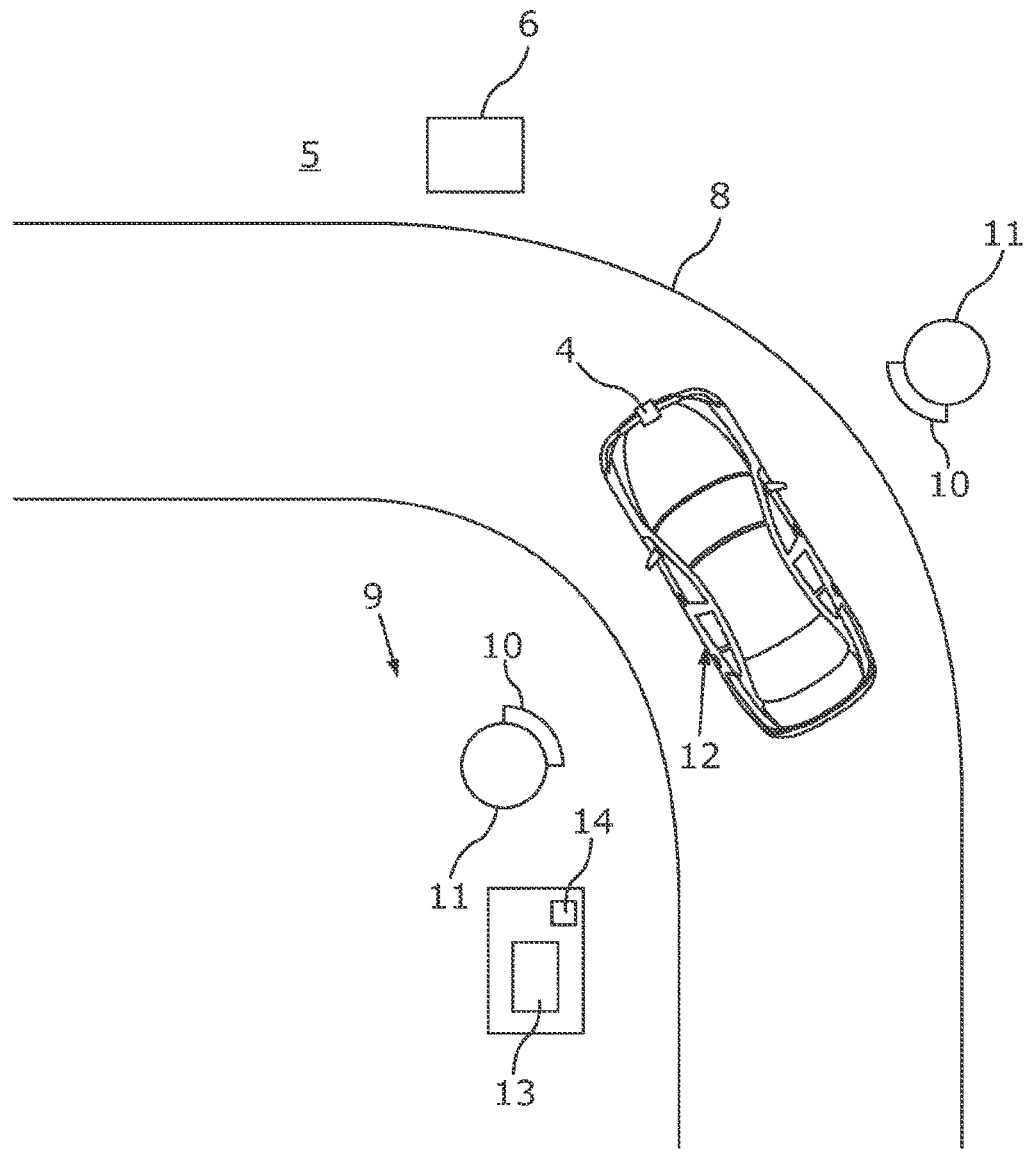
FIG. 2 shows the vehicle, which is being maneuvered on a calibration route for calibrating the environment sensor, wherein an external detection device is assigned to the calibration route.

FIG. 2 shows a schematic illustration of the vehicle 1, which is being maneuvered along a calibration route 8. During the maneuvering of the vehicle 1 on the calibration route 8, the environment sensor 4 of the vehicle 1 is to be calibrated. The calibration route 8 can be a defined route section on which the vehicle 1 is moved. The vehicle 1 can be maneuvered in an at least semiautomated manner along the calibration route 8. For example, the vehicle 1 can be maneuvered after the manufacturing or in the factory environment on the calibration route 8.

A reference object 6, which is detected using the environment sensor 4, is assigned to the calibration route 8. For this purpose, the measurement data, which describe the relative location of the environment sensor 4 to the reference object 6 and/or a relative velocity between the environment sensor 4 and the reference object 6, are provided using the environment sensor 4. As explained above, these measurement data can be transmitted to the computing device 3. Moreover, data which describe an installation position of the environment sensor 4 on the vehicle 1 can be stored in the computing device 3 or in a memory of the computing device 3.

Moreover, the knowledge of the actual relative location of the vehicle 1 in relation to the reference object 6 or the actual relative velocity between the vehicle 1 and the reference object 6 is required for the calibration of the environment sensor 4. In the present case, the driving tube of the vehicle 1 during the maneuvering on the calibration route 8 is known, since it was planned by the driving planning device 15. Therefore, the vehicle data, such as velocity, acceleration, yaw rate, rolling, or the like can be predicted with a high level of confidence. Correction data can then be determined within the vehicle 1 by means of the computing device 3 on the basis of the uncalibrated measurement data and the vehicle data. The calibration of the environment sensor 4 can then be carried out on the basis of the correction data.

In the present case, detection data which are provided by means of an external detection device 9 are moreover used to improve the prediction of the vehicle data. The external detection device 9 comprises at least one sensor device 10, by means of which the vehicle 1 can be progressively detected during the maneuvering on the calibration route 8. In the exemplary embodiment shown, the external detection device 9 comprises two sensor devices 10, which are arranged by way of example on opposite sides of the calibration route 8. Furthermore, the sensor devices 10 are mounted on corresponding pillars 11 or columns. The sensor devices 10 can be designed, for example, as a camera or as a lidar sensor.

Data, which each describe an area of an outer envelope 12 of the vehicle 1, can be provided using the respective sensor devices 10. These data of the sensor devices 10 can then be transmitted to a computer 13 of the external detection device 9. A model of the external envelope 12 of the vehicle 1 can be stored in a memory of the computer 13, for example. The detection data can thus be determined on the basis of the data which are provided using the sensor devices 10 and the model of the vehicle 1. These detection data describe the position and/or the movement of the vehicle 1 on the calibration route 8. The detection data can then be transmitted by means of a transmitting device 14 of the external detection device 9 to the receiving device 7 of the vehicle 1 or the sensor system 2.

Moreover, it can be provided that the control signals for controlling the movement of the vehicle 1 along the calibration route 8 are adapted in dependence on the comparison of the detection data to the predicted vehicle data. Moreover, the wiring system data, which also describe the movement of the vehicle 1 and which are provided using the vehicle-internal movement sensor 16, can be used. These wiring system data can additionally be used to improve the confidence of the prediction of the vehicle data.

The invention claimed is:

1. A method for processing measurement data from an environment sensor of a vehicle so as to calibrate the environment sensor, the method comprising:
receiving driving planning data describing a future movement of the vehicle during at least semiautomated operation of the vehicle;
determining, from the driving planning data, predicted vehicle data describing a predicted position and/or movement of the vehicle at a point in time during the future movement of the vehicle;
receiving, from a movement sensor of the vehicle, wiring system data describing the position and/or movement of the vehicle;
receiving the measurement data for the at least one point in time from the environmental sensor; and calibrating the environment sensor by processing the measurement data for the at least one point in time based on the predicted vehicle data and the wiring system data.

2. The method according to claim 1, wherein the driving planning data are received from a driving planning device of the vehicle.

3. The method according to claim 1, wherein the driving planning data are received from a vehicle-external driving planning device.

4. The method according to claim 1,
wherein detection data are received from an external detection device,
wherein the detection data describe the position and/or the movement of the vehicle, and
wherein the detection data are compared to the predicted vehicle data.

5. The method according to claim 4, wherein control signals for controlling and/or regulating the movement of the vehicle are output in dependence on the comparison.

6. A computing device for a vehicle, wherein the computing device is configured to carry the method of claim 1.

7. A non-transitory computer-readable medium having computer executable instructions stored thereon which, upon the execution by the computer, cause the computer to carry out the method of claim 1.

\* \* \* \* \*